(12) United States Patent
Kuenzi et al.

(10) Patent No.: US 12,087,112 B2
(45) Date of Patent: Sep. 10, 2024

(54) ACCESS CONTROL ACCESSIBILITY

(71) Applicant: Carrier Corporation

(72) Inventors: Adam Kuenzi, Silverton, OR (US); Adam Cooper, Independence, OR (US); Jonah J. Harkema, Newberg, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/305,879

(22) Filed: Jul. 16, 2021

(65) Prior Publication Data

US 2022/0036672 A1 Feb. 3, 2022

Related U.S. Application Data

(60) Provisional application No. 62/706,025, filed on Jul. 28, 2020.

(51) Int. Cl.
*G07C 9/00* (2020.01)
*H04W 12/08* (2021.01)
(Continued)

(52) U.S. Cl.
CPC ..... *G07C 9/00309* (2013.01); *G07C 9/00563* (2013.01); *G07C 9/00944* (2013.01); *H04W 12/08* (2013.01); *H04W 12/47* (2021.01); *H04W 64/00* (2013.01); *G07C 2009/00396* (2013.01); *G07C 2009/00952* (2013.01)

(58) Field of Classification Search
CPC ............ H03H 9/215; H03H 3/04; H03H 9/19; H03H 2003/026; H03H 2003/0414; H03H 9/0509; H03H 9/0519; H03H 9/0542; H03H 9/0547; H03H 9/1021; B22F 1/107; B22F 2003/1042; B22F 3/10; B22F 2998/10; B22F 2999/00; B22F 7/064; B22F 7/08;
(Continued)

(56) References Cited

U.S. PATENT DOCUMENTS 9,384,608 B2 * 7/2016 Strulovitch .............. G07C 9/22
9,659,424 B2 * 5/2017 Huber ................ G07C 9/00571
(Continued)

FOREIGN PATENT DOCUMENTS

EP 3671670 A1 6/2020

OTHER PUBLICATIONS

EP Application No. 21188319.4, Search Report, Dec. 16, 2021, 8 pages.

*Primary Examiner* — Nam V Nguyen
(74) *Attorney, Agent, or Firm* — Seager, Tufte & Wickhem, LLP

(57) ABSTRACT

An access control system and a method for operating an access control system are provided. The access control system includes an access control device. The method provides a step for initiating the transmission of the advertising signal by a communication module of the access control device, the advertising signal being received by a mobile device. The method provides a step for automatically receiving an access credential from the mobile device to the communication module of the access control device. The method provides a step for comparing, in an authentication module, the access credential with an authorized access credential (e.g., stored in a memory of the access control device).

17 Claims, 3 Drawing Sheets

(51) Int. Cl.
*H04W 12/47* (2021.01)
*H04W 64/00* (2009.01)

(58) Field of Classification Search
CPC .. C08G 65/336; B29K 2083/00; C22C 1/0466
USPC .................................................. 340/5.6, 5.61
See application file for complete search history.

(56) References Cited

U.S. PATENT DOCUMENTS

| | | | | |
|---|---|---|---|---|
| 9,670,694 | B2* | 6/2017 | Larson | E05B 67/00 |
| 9,704,319 | B2* | 7/2017 | Desinor, Jr. | G07C 9/00896 |
| 9,710,978 | B1* | 7/2017 | Sequeira | G07C 9/00896 |
| 9,728,022 | B2* | 8/2017 | Gengler | G07C 1/00174 |
| 10,142,843 | B2* | 11/2018 | Conrad | H04W 12/08 |
| 10,229,550 | B1 | 3/2019 | Tudi | |
| 10,523,671 | B1* | 12/2019 | Whitman | H04W 12/30 |
| 10,643,414 | B2* | 5/2020 | Davis | H04W 12/06 |
| 10,717,412 | B2* | 7/2020 | Abel Rayan | H04W 12/68 |
| 11,010,995 | B2* | 5/2021 | Davis | G07C 9/215 |
| 11,302,131 | B2* | 4/2022 | Kolb | E05B 45/005 |
| 11,361,060 | B1* | 6/2022 | Lyman | H04L 12/2829 |
| 2004/0248550 | A1* | 12/2004 | Hausner | H04W 12/08 |
| | | | | 455/410 |
| 2005/0149752 | A1* | 7/2005 | Johnson | G06F 21/88 |
| | | | | 726/4 |
| 2009/0184801 | A1 | 7/2009 | Bliding et al. | |
| 2010/0315244 | A1* | 12/2010 | Tokhtuev | G16H 40/20 |
| | | | | 340/603 |
| 2011/0053557 | A1* | 3/2011 | Despain | G07C 9/00309 |
| | | | | 455/410 |
| 2014/0077929 | A1* | 3/2014 | Dumas | G07C 9/00571 |
| | | | | 340/5.61 |
| 2015/0292244 | A1 | 10/2015 | Beatty | |
| 2015/0356797 | A1* | 12/2015 | McBride | G07C 9/29 |
| | | | | 340/5.61 |
| 2016/0035163 | A1 | 2/2016 | Conrad et al. | |
| 2016/0284183 | A1* | 9/2016 | Trani | H04W 4/33 |
| 2017/0103647 | A1* | 4/2017 | Davis | G07C 9/00174 |
| 2017/0132861 | A1* | 5/2017 | Ho | G07C 9/00896 |
| 2019/0130684 | A1 | 5/2019 | Bryla et al. | |
| 2019/0318559 | A1 | 10/2019 | Pang et al. | |
| 2022/0198863 | A1* | 6/2022 | Ho | G07C 9/37 |

\* cited by examiner

ACCESS CONTROL ACCESSIBILITY

CROSS REFERENCE TO A RELATED APPLICATION

The application claims the benefit of U.S. Provisional Application No. 62/706,025 filed Jul. 28, 2020, the contents of which are hereby incorporated in their entirety.

BACKGROUND

This invention relates to access control devices. More particularly, the invention relates to the way in which protected environments, controlled by access control devices, are accessed.

Access control devices (e.g., access control readers, lockboxes, and hotel locks) can be used to control various types of protected environments. Access control readers can be used to regulate the entry into and movement within a building. Lockboxes can be used to control the access to one or more items inside the lockbox (e.g., a key for a door to a home). Hotel locks can be used to limit access to a hotel room. To access the protected environment, authorized access credentials must be presented (e.g., to the access control device). These access credentials are commonly presented to the access control devices using an RFID card, a FOB, a card with a magnetic stripe, and/or a mobile device, such as a smart phone. Due to the wide variety of potential applications, access control devices may be used in a plethora of different industries.

For example, lockboxes, sometimes referred to as "keyboxes", are commonly used in the real estate industry. These lockboxes are commonly placed on a doorknob or porch of a house listed for sale. These lockboxes are used to protect a key for a door to the house (e.g., by storing the key within the lockbox). These lockboxes allow a real estate agent to access and show a house when the owner is unavailable. These lockboxes are helpful, but the market could use a lockbox with increased capabilities and accessibility. For example, typically lockboxes require real estate agents to physically push a key container on the lockbox to enable a Bluetooth feature. Additionally, the agent's smart phone prompts the agent to enter a PIN code for authentication before communicating to the lockbox. This requires the agent to use their phone (e.g., taking it from their pocket) after reaching the lockbox in order to enter the PIN code. This PIN code is transmitted from the phone to the lockbox for authentication. Once the authentication is complete, the typical lockbox requires the real estate agent to push the key container to access the key stored within the container. These steps are time consuming for clients looking to view the home and for the real estate agents looking to show the home.

Accordingly, there remains a need for a more accessible way to access the environment protected by the access control device.

BRIEF DESCRIPTION

According to one embodiment, an access control system including an access control device is provided. The access control device includes a communication module, a detection sensor, a memory, and an authentication module. The communication module is configured to wirelessly transmit an advertising signal when initiated, and to wirelessly receive an access credential from a mobile device, the access credential being automatically received from the mobile device. The detection sensor is electrically coupled to the communication module. The detection sensor is configured to initiate the transmission of the advertising signal by the communication module when a status event is detected. The memory is provided for storing an authorized access credential. The authentication module is electrically coupled with the communication module and the memory. The authentication module is configured to compare the access credential with the authorized access credential.

In accordance with additional or alternative embodiments, the receiving of the access credential is conditioned on at least one of: a signal strength, a validation of a biometric identifier, and a movement of the mobile device.

In accordance with additional or alternative embodiments, the biometric identifier is captured by the mobile device.

In accordance with additional or alternative embodiments, the captured biometric identifier is compared with an authorized biometric identifier stored in a memory of the mobile device.

In accordance with additional or alternative embodiments, wherein the biometric identifier is validated when the biometric identifier matches the authorized biometric identifier.

In accordance with additional or alternative embodiments, wherein the automatic receiving of the access credential is deactivated when the biometric identifier does not match the authorized biometric identifier.

In accordance with additional or alternative embodiments, wherein the automatic receiving of the access credential is maintained when the biometric identifier matches the authorized biometric identifier.

In accordance with additional or alternative embodiments, the biometric identifier includes at least one of: a fingerprint, a facial image, an iris image, a voice recording, and a gait pattern.

In accordance with additional or alternative embodiments, the access control device further includes a lock actuator configured to unlock when the access credential matches the stored authorized access credential.

In accordance with additional or alternative embodiments, the access control device further includes a compartment operably coupled with the lock actuator.

In accordance with additional or alternative embodiments, the status event includes at least one of: a movement of the compartment, a vibration detection, a motion detection, a sound detection, an infrared detection, and a rotation of a handle.

In accordance with additional or alternative embodiments, at least one of the advertising signal and the access credential are transmitted using a short-range communication, the short-range communication including at least one of: Bluetooth, Bluetooth Low Energy (BTLE), Zigbee, infrared, and Wi-Fi.

In accordance with additional or alternative embodiments, the access control device is battery powered.

According to another aspect of the disclosure, a method for operating an access control system including an access control device is provided. The method includes a step for initiating the transmission of the advertising signal by a communication module of the access control device, the advertising signal being received by a mobile device. The method includes a step for receiving, automatically, an access credential from the mobile device in the communication module of the access control device, the communication module of the access control device electrically coupled with an authentication module of the access control device. The method includes a step for comparing, in the authentication module, the access credential with an authorized access credential, the authorized access credential being stored in a memory of the access control device.

In accordance with additional or alternative embodiments, the method further includes unlocking a compartment when the access credential matches the stored authorized access credential.

In accordance with additional or alternative embodiments, the method further includes actuating the compartment to release a key from within the compartment.

In accordance with additional or alternative embodiments, the transmission of the advertising signal is initiated by the detection of a status event.

In accordance with additional or alternative embodiments, the status event includes at least one of: a movement of a compartment, a vibration detection, a motion detection, a sound detection, an infrared detection, and a rotation of a handle.

In accordance with additional or alternative embodiments, the receiving of the access credential is conditioned on at least one of: a signal strength, a validation of a biometric identifier, and a movement of the mobile device.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Access control devices (e.g., access control readers, lockboxes, and hotel locks) may grant or deny access to a particular environment based on whether or not authorized access credentials are received. The credentials may be transmitted with a separate item (e.g., an RFID card, a FOB, a card with a magnetic stripe, and/or a mobile device, such as a smart phone). With each of these separate items the user (e.g., a hotel guest or a real estate agent) typically must physically handle the item when at the access control device in order to gain access to the protected environment, which can be inconvenient to the user. The access control system described herein overcomes these inconveniences. For example, instead of forcing the user to physically handle (e.g., remove from their pocket/bag, unlock the device, and enter a PIN or similar code) while at the access control device, the access control system described herein allows the mobile device to remain stowed away (e.g., in a pocket or bag) while still being able to gain access to the protected environment with the mobile device. As such, the access control system described herein provides a more seamless access to the protected environment.

Figure 1:
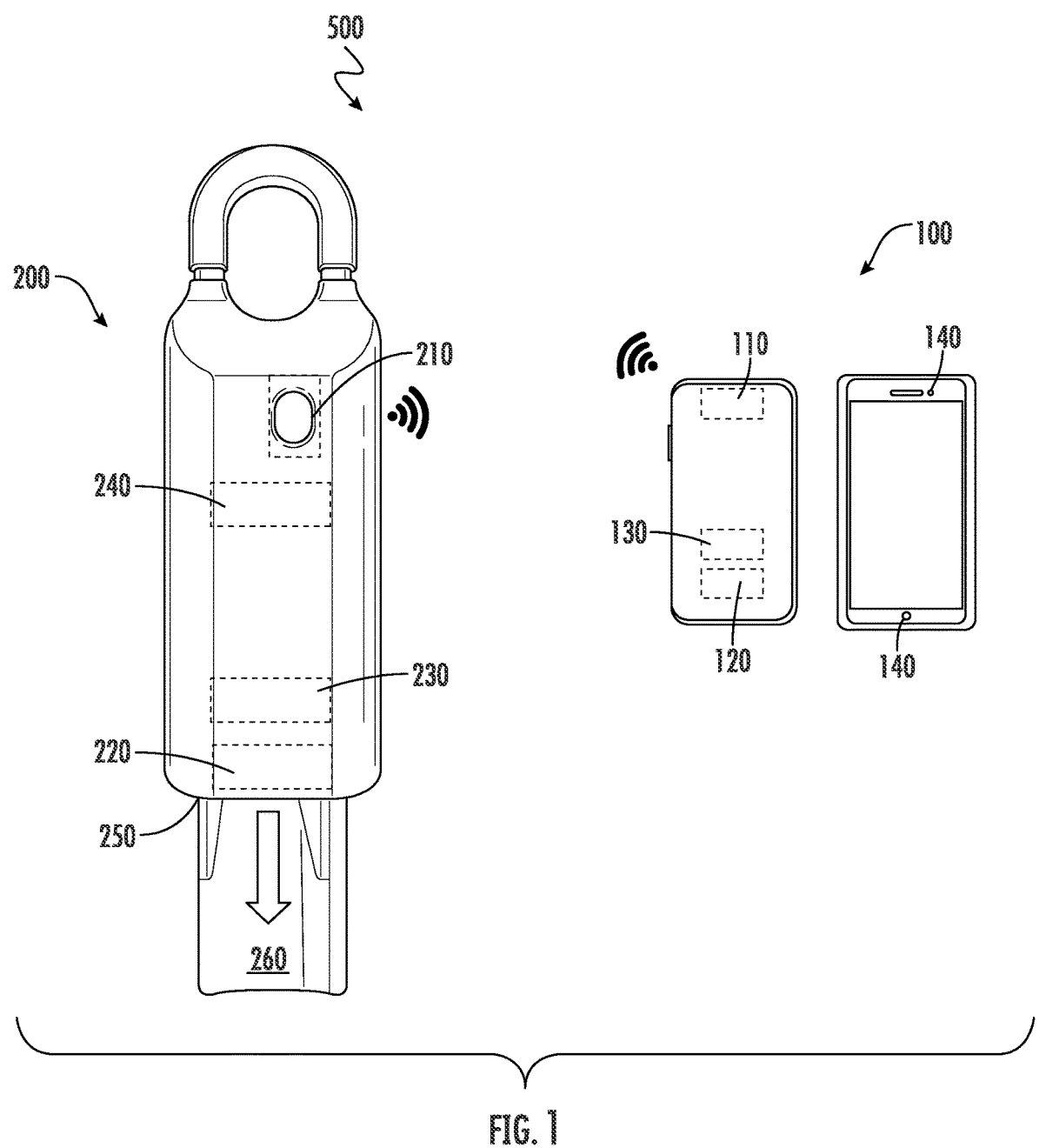
FIG. 1 is a schematic illustration of a first embodiment of an access control system with an access control device in accordance with one aspect of the disclosure.
Figure 2:
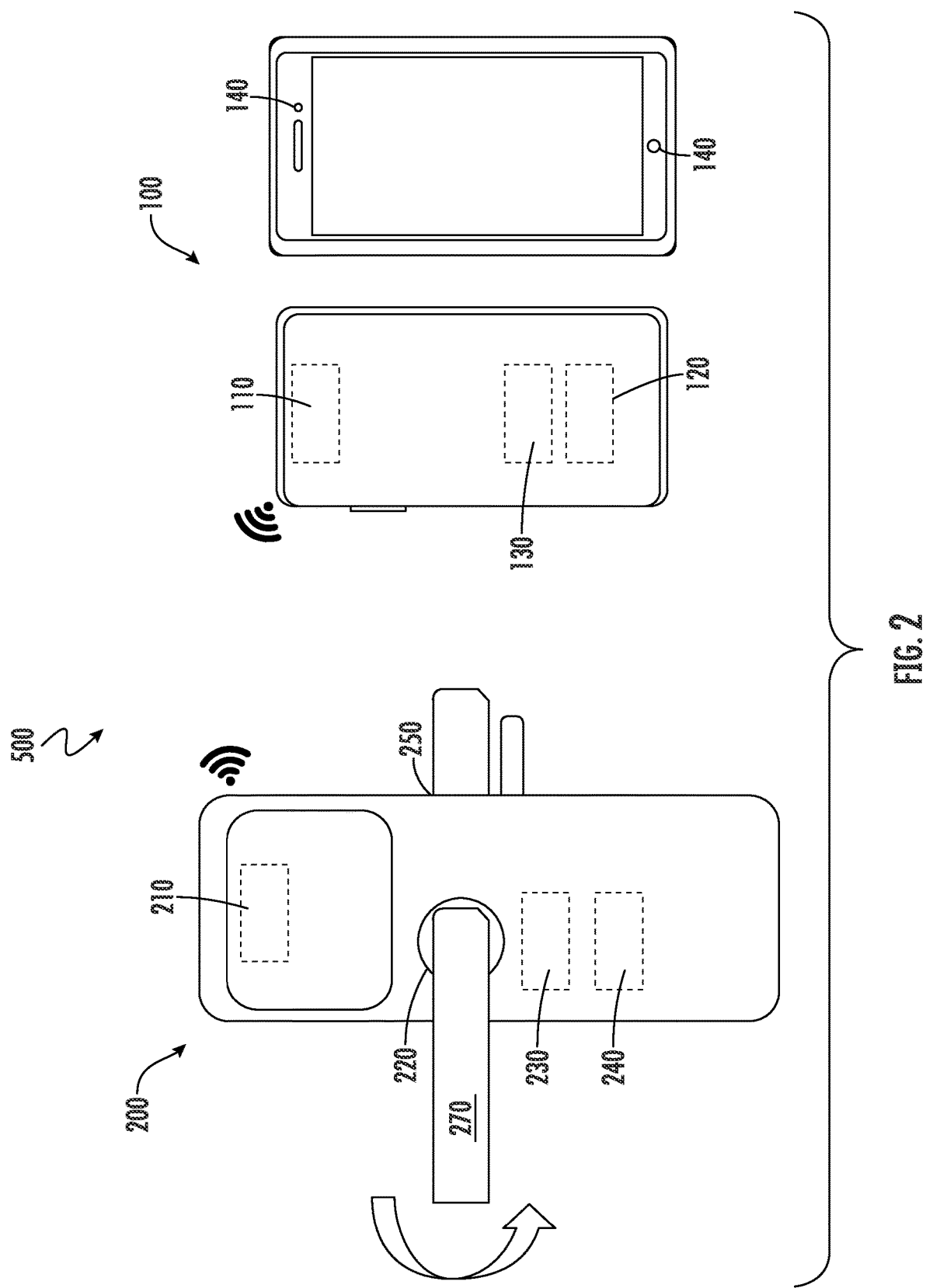
FIG. 2 is a schematic illustration of a second embodiment of an access control system with an access control device in accordance with one aspect of the disclosure.

With reference now to the Figures, various schematic illustrations of exemplary access control systems 500 are shown in FIGS. 1 and 2. FIG. 1 illustrates a first embodiment of the access control system 500 where the access control device 200 is embodied as a lockbox. FIG. 2 illustrates a second embodiment of the access control system 500 where the access control device 200 is embodied as a hotel lock. In both embodiments shown the access control system 500 includes an access control device 200 (e.g., in communication with a mobile device 100). It is envisioned that the mobile device 100, although depicted as a smart phone, may be any device (e.g., smart phone, mobile tablet, smart watch, wearable, etc.) that is capable of receiving an advertising signal and automatically communicating access credentials. Regardless of the embodiment, the access control system 500 enables the mobile device 100 to remain stowed away during the presentation of the access credentials, which makes the access control system 500 more accessible and less inconvenient than existing systems.

As depicted in FIGS. 1 and 2, the access control device 200 may include a communication module 210, a detection sensor 220, a memory 230, and an authentication module 240. The communication module 210 is configured to wirelessly transmit an advertising signal, and to wirelessly receive an access credential. In certain instances, the communication module 210 is configured to wirelessly transmit and wireless receive using a short-range communication (e.g., Bluetooth, Bluetooth Low Energy (BTLE), Zigbee, infrared, and Wi-Fi).

The detection sensor 220 is electrically coupled to the communication module. The detection sensor 220 is configured to initiate the transmission of the advertising signal by the communication module when a status event is detected. The detection sensor 220 may include any technology capable of detecting a physical event event (e.g., pressure detection such as the movement of a component, vibration detection, motion detection, sound detection, infrared detection, and rotation of a handle). For example, the detection sensor 220 may include any technology a passive infrared sensor, a radar motion sensor, and/or a capacitive sensor capable of capturing a status event.

The memory 230 is used for storing an authorized access credential. The memory 230 may include, but it not limited to, any of the following: a hard disk, a random access memory (RAM), a read-only memory (ROM), an erasable programmable read-only memory (EPROM or Flash Memory), a static random access memory (SRAM), a portable compact disc read-only memory (CD-ROM), a digital versatile disk (DVD), a memory stick, and any suitable combination of the foregoing.

The authentication module 240 is electrically coupled with the communication module 210 and the memory 230. It is envisioned that the authentication module 240 may complete one or more of the following: (i) verify that the received access credentials are valid (e.g., by checking a digital signature), (ii) verify the received access credentials are not expired (e.g., by checking an expiration date of the access credentials against a trusted time/date from the access control device 200 or other location), and (iii) complete the comparison of the received access credentials with something stored (e.g., stored authorized access credentials). For example, the authentication module 240 may be configured to compare the received access credentials with the stored authorized access credentials. The authentication module 240 may include a processor to enable the comparison of the received access credential with the stored authorized access credentials. The processor may be, but is not limited to, a single-processor or multi-processor system of any of a wide array of possible architectures, including field programmable gate array (FPGA), a central processing unit (CPU), application specific integrated circuits (ASIC), digital signal processor (DSP) or graphics processing unit (GPU) hardware arranged homogenously or heterogeneously.

It is envisioned that the access control device 200 is capable of seamlessly working with a mobile device 100. The mobile device 100 includes a memory 130 and a communication module 110. The mobile device 100 may, in certain instances, be viewed as a smart phone, such as those running the Android™ operating system of Google Inc., of Mountain View, Calif, or the iOS™ operating system of Apple Inc., of Cupertino, Calif., or the BlackBerry™ operating system of BlackBerry Limited, of Waterloo, Ontario. The mobile device 100 is programmed with an application (e.g., an access app) that allows it to communicate wirelessly with the access control device 200. For example, communication module 110, 210 of the mobile device 100 and the access control device 200 may include transceivers and associated circuitry to enable infrared (IR) or other form of optical or radiofrequency (RF) (e.g., Bluetooth™ (certification mark of Bluetooth SIG, Inc., Kirkland, Wash.) or near field communication (NFC)) communication when within proximity of each other. One suitable infrared communication protocol is the IrDa™ (Infrared Data Association, Walnut Creek, Calif.) standard.

The application (e.g., which may allow for wireless communication between the access control device 200 and the mobile device 100) may be stored in the memory 130. The memory 130 may include, but it not limited to, any of the following: a hard disk, a random access memory (RAM), a read-only memory (ROM), an erasable programmable read-only memory (EPROM or Flash Memory), a static random access memory (SRAM), a portable compact disc read-only memory (CD-ROM), a digital versatile disk (DVD), a memory stick, and any suitable combination of the foregoing, to store the application. The communication module 110 of the mobile device 100 may be configured to listen for the advertising signal when initiated, and to automatically transmit the access credential (which is automatically received by the access control device 200) when the advertising signal is received. For example, the mobile device 100 may be able to remain stowed away (e.g., in a pocket or bag) while receiving the advertising signal from the access control device 200 and while transmitting the access credential to the access control device 200.

It is envisioned that the application stored in the memory 130 of the mobile device 100 may enable the user (e.g., a real estate agent or hotel guest) to communicate with a central authority (e.g., to receive access credentials for a given access control device 200). This central authority may be viewed as any authoritative body capable of controlling access to a given access control device 200. For example, the central authority may be the front desk for a hotel, or a governing body for a multiple listing service. The central authority may administer the access privileges of users (e.g., hotel guest or real estate agents) and the access preferences of individuals either owning or occupying the protected environment (e.g., owners of a home that is listed for sale). The central authority may include one or more computers or servers with appropriate communications equipment to enable communication with the users and/or the individuals either owning or occupying the protected environment. These computers or servers individually or collectively may include appropriate processors, memory, or the like to execute programs to perform basic computer functions associated with the responsibilities of the central authority.

The central authority may include a database, which may store identifying information (e.g., telephone number(s) assigned to a user/individual, an address of a particular protected environment, status of the user/individual with the particular authoritative body, and any unique device identifiers for a particular mobile device 100 or access control device 200). This database may pair particular identifying information together. For example, the database may store which unique device identifier, associated with a particular access control device 200, is being used to store a key for a house with a particular address. It should be appreciated that this information may be updated from time to time by members/employees of the central authority, users (e.g., hotel guests or real estate agents), and/or individuals who either own or occupy the protected environment. It is envisioned that pieces of various identifying information may be communicated to the mobile device 100 in order for the mobile device 100 to be able to access certain protected environments. For example, the mobile device 100 may receive access credentials from the central authority to be able open certain access control devices 200 (e.g., to gain access to a key inside the access control device 200 to be able to open a door to a home being sold).

This identifying information may also allow the mobile device 100 to transmit the correct access credentials to the correct access control device 200. For example, the mobile device 100 may receive identifying information, such as a unique device identifier (e.g., consisting of a unique numeric or alphanumeric code), for a particular access control device 200. It should be appreciated that at least portion of a unique device identifier may be transmitted between the access control device 200 and the mobile device 100 when communicating (e.g., the access control device 200 may transmit a portion of its own unique device identifier when transmitting the advertising signal). Receiving of the advertising signal with the unique device identifier may prompt the mobile device 100 to transmit a particular access credential (e.g., associated with the particular access control device 200).

In certain instances, the mobile device 100 is continuously listening for this advertising signal once initiated. For example, the mobile device 100 may be initiated in the application (e.g., which is stored in the memory 130) to continuously listen for the advertising signal. It is envisioned that a user of the mobile device 100 may initiate the continuous listening for the advertising signal prior to coming within proximity of the access control device 200. For example, the user may unlock (e.g., by entering a PIN or biometric information, such as a fingerprint or facial image) their mobile device 100 and open the application to enable the mobile device 100 to continuously listen for an advertising signal from one or more access control device 200. In certain instances, the act of opening the mobile device 100 may initiate the continuously listening for the advertising signal (e.g., without having to open the application). This initiation of continuous listening may enable the access credentials to be automatically transmitted from the mobile device 100 to the access control device 200 (e.g., the mobile device 100 may automatically transmit the access credentials to the access control device 200 upon receipt of the advertising signal). In certain instances, the transmission of the access credential by the mobile device 100 may be conditioned on signal strength (e.g., wherein the automatic transmission/receiving of the access credential is conditioned based on the signal strength of the advertising signal). For example, the access credential may not be automatically transmitted/received if the signal strength of the advertising signal is not above a certain threshold (e.g., which may correlate to the mobile device 100 being within a certain minimum distance, such as 10 feet, from the access control device 200). This continuous listening and automatic transmission/receiving may allow the mobile device 100 to remain stowed away during the presentation of the access credentials, which may make the access control system 500 more accessible and less inconvenient than existing systems.

To ensure that the mobile device 100 is being used by an intended person (e.g., a registered guest or a particular real estate agent), the access control system 500 may verify the identity of the user. For example, mobile device 100 may include an authentication module 120 electrically coupled with the communication module 110 and the memory 130 of the mobile device 100 to verify an identity of the user. In addition, the mobile device 100 may include a biometric reader 140 electrically coupled with the authentication module 120 of the mobile device 100.

The biometric reader 140 may be configured to capture a biometric identifier (e.g., a fingerprint, a facial image, an iris, a voice recording, and a gait pattern). The biometric reader 140 may utilize any suitable technology capable of capturing a biometric identifier (e.g., a camera, a microphone, accelerometer, etc.) and conveying information regarding the biometric identifier to the authentication module 120. It should be appreciated that in certain instances the authentication module 120 may be part of the application running in the memory 130. For example, the biometric reader 140 may convey the biometric identifier as a wireless signal (e.g., through one or more wired or wireless connections) to the authentication module 120. The authentication module 120 may include a processor to enable the comparison of the captured biometric identifier with an authorized biometric identifier (e.g., stored in the memory 130 of the mobile device 100). For example, the authentication module 120 may compare the captured biometric identifier with a stored authorized biometric identifier that was input by the user when registering the mobile device 100. The processor may be, but is not limited to, a single-processor or multi-processor system of any of a wide array of possible architectures, including field programmable gate array (FPGA), a central processing unit (CPU), application specific integrated circuits (ASIC), digital signal processor (DSP) or graphics processing unit (GPU) hardware arranged homogenously or heterogeneously. In certain instances, the authentication module 120 verifies the identity when the captured biometric identifier matches the authorized biometric identifier.

This verification of identity may be used to provide added safety and security for the access control system 500. For example, the authentication module 120 may be configured to deactivate at least one of: the listening for the advertising signal and the automatic transmission/receiving of the access credential when the biometric identifier does not match the authorized biometric identifier. It is envisioned that the authentication module 120 may be configured to periodically verify the identity of the user of the mobile device 100 (e.g., verifying identity every time the mobile device 100 is unlocked/opened or at various time intervals throughout the day). In certain instances, the authentication module 120 may be configured to maintain the listening for the advertising signal and the automatic transmission/receiving of the access credential when the biometric identifier matches the authorized biometric identifier.

As described above, the access control device 200 may require the presentation of authorized access credentials to access the protected environment. In certain instances, the access control device 200 includes a lock actuator 250, which may prevent the protect environment from being accessed. This lock actuator 250 may be configured to unlock when the access credentials being presented (e.g., from the mobile device 100) match the stored authorized access credentials. For example, the access control device 200 may include a compartment 260, which may contain a key for a door to a house (e.g., that is listed for sale). The lock actuator 250 may prevent the compartment 260 from being opened (e.g., which would allow the key to be accessed) without presenting authorized access credentials.

In certain instances, the access control system 500 may operate based on the detection of a status event (e.g., the movement of the compartment 260, a vibration detection, a motion detection, a sound detection, an infrared detection, and a rotation of a handle 270). For example, the transmission of the advertising signal by the communication module 210 of the access control device 200 may be initiated by the detection of a status event. As described below, waiting to transmit the advertising signal until a status event is detected may allow for the access control device 200 to be battery powered. When relying on battery power it may be advantageous for the access control device 200 to "sleep" when not being used so as to preserve power. For example, various components of the access control device 200 may go inactive so as to not consume power when the access control device 200 is "sleeping". In certain instances, the detection sensor 220 may remain active while the remainder (or at least a portion) of the access control device 200 is "sleeping" so as to be able to "wake-up" the sleeping component of the access control device 200 when a status event is detected. This waking up of the access control device 200 by the detection sensor 220 may initiate the transmission of the advertising signal by the communication module 210. It should be appreciated that in certain instances the access control device 200 may not be configured to go to "sleep". For example, in certain instances, all of the components of the access control device 200 may remain awake at all times and may wait to transmit the advertising signal until the status event is detected by the detection sensor 220.

It is envisioned that the above described access control system 500 may allow the mobile device 100 to remain stowed away during the presentation of the access credentials, which may make the access control system 500 more accessible and less inconvenient than existing systems. For example, the access control system 500 described herein may allow the protected environment to be accessible faster than existing systems by cutting out the time traditionally consumed by the user physically handling (e.g., to remove the mobile device 100 from their pocket/bag, unlock the mobile device 100, and enter a PIN or similar code in the mobile device 100) their mobile device 100. This time savings per encounter with each access control device 200 may be exponentially valuable for certain industries. For example, in certain industries (e.g., in the real estate industries) where numerous protected environments (e.g., listed houses) may need to be accessed in a relatively short period of time, saving a few minutes (or seconds) at each access control device 200 may dramatically increase potential profits (e.g., as more houses may be able to be shown in a given day).

Instead of requiring the entering of a PIN code while at the access control device 200 (as is done in many existing systems), the access control system 500 described herein, in certain instances, replaces the PIN code with a periodic biometric validation. For example, the access control system 500 may capture a biometric identifier (e.g., a fingerprint, a facial image, an iris, a voice recording, and a gait pattern) to verify an identity (e.g., of the user of the mobile device 100). It is envisioned that a system administrator may, as part of a policy, require the identity be verified within a certain period of time prior to the access event (e.g., the opening/unlocking of the access control device 200). For example, the automatic transmission/receiving of the access credential may be conditioned on the identity being verified within a certain amount of time (e.g., a biometric identifier may need to be validated within a 24-hour period prior to the transmission of the access credential).

Additionally, it is envisioned that the access control system 500 may use the biometric reader 140 (which captures the biometric identifier) to detect movement of the mobile device 100. In certain instances, the transmission of the access credential may be conditioned based on the movement of the mobile device 100. For example, the biometric reader 140 may be capable of detecting whether the mobile device 100 has been continuously carried or set down. If the mobile device 100 is set down, the access control system 500 may require the identity be verified (e.g., by capturing a biometric identifier) before the access credential may be transmitted. It should be appreciated that the identity may be verified without requiring the user to physically handle (e.g., remove from their pocket/bag) the mobile device 100. For example, the identity may be verified by capturing the voice and/or gait of the user while the mobile device 100 is stowed away.

It is envisioned that the access control system 500 may provide indicators and/or opportunities for exception handling. For example, if the access credential is automatically sent and successfully validated, the user (e.g., of the mobile device 100) may receive feedback via the mobile device 100 (e.g., haptic feedback such as a vibration of the mobile device 100 and/or a sound playing on the mobile device 100), and/or the access control device 200 (e.g., LEDs may blink on the access control device 200). It should be appreciated that similar feedback (e.g., from the mobile device 100 and/or access control device 200) may also occur when the access credential is not successfully received and/or validated. For example, "positive" feedback may occur when there is a successful validation of an access credential, and "negative" feedback may occur when the validation of the access credential is not successful. The positive feedback may be in the form of a happy 'DING' sound, indicating that the access control device 200 is ready to open. The negative feedback may be in the form of a 'RASPBERRY' sound, indicating that the access control device 200 is not ready to open. This feedback may prompt the user to either open the access control device 200 (e.g., if positive feedback occurs), or complete exception handling (e.g., if negative feedback occurs).

In the event of an exception (e.g., when the access credentials are not successfully validated), the user of the mobile device 100 may be able to handle the mobile device 100 (e.g., to launch the application) to view the error on the screen of the mobile device 100. It should be appreciated that the user may be able to handle the mobile device 100 to view a successful validation as well. When the access credentials are not successfully validated, the user may be able to 'try again' by manually sending credentials (e.g., by entering a PIN code on the screen of the mobile device 100, as is commonly done today). If the PIN code is accepted, positive feedback, as described above, may occur, which may indicate to the user that the access control device 200 is ready to open. It is envisioned that the goal of the access control system 500 may be to minimize any physical handling of the mobile device 100. For example, the mobile device 100 may only need to be physically handled at the access control device 200 when the access credentials are not successfully validated. However, as described above, when necessary, the access control system 500 may allow for physical handling of the mobile device 100 to manually send credentials.

Figure 3:
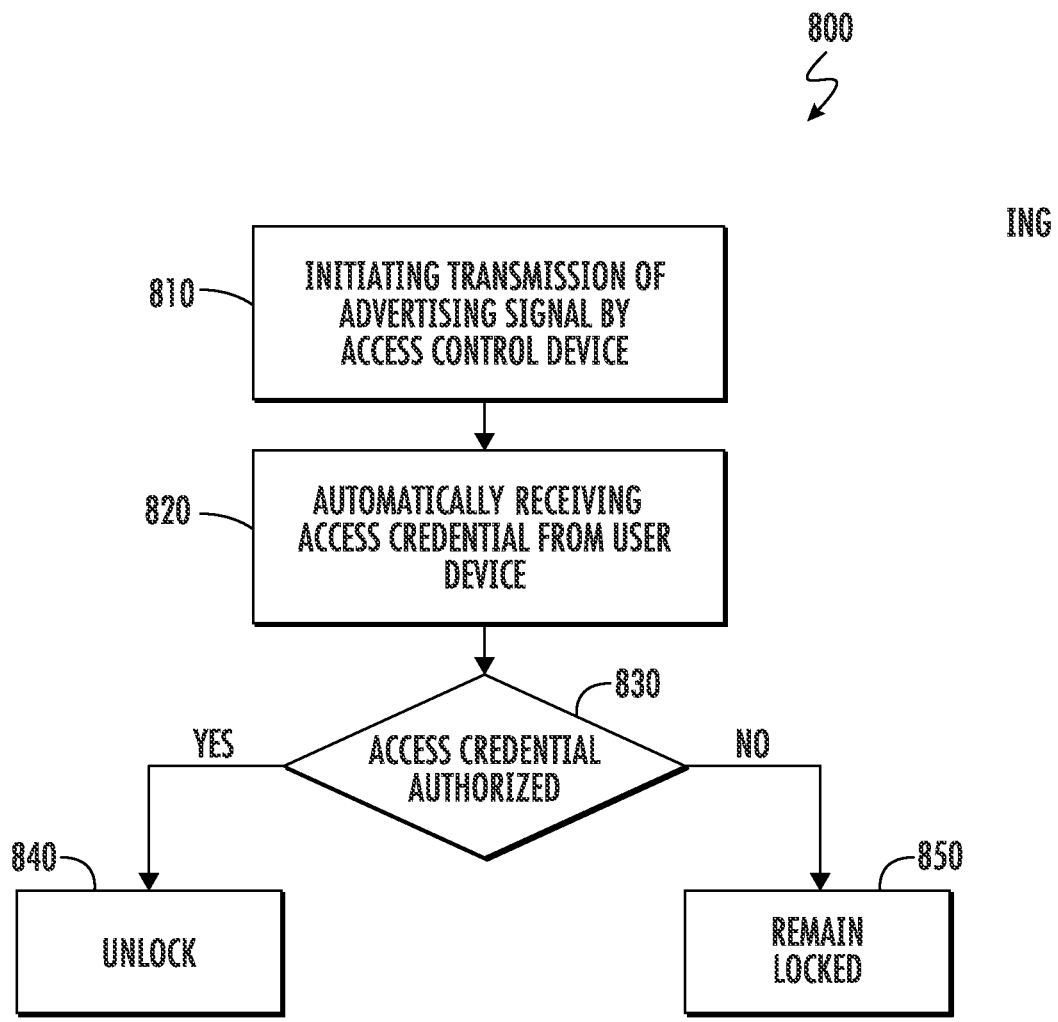
FIG. 3 is a flow diagram illustrating a method of operating an access control system including an access control device in accordance with one aspect of the disclosure.

The access control system 500 described herein may provide both increased security (e.g., by verifying the identity of a user based on a biometric identifier instead of a PIN code) and increased accessibility (e.g., by automatically transmitting/receiving access credentials without requiring the mobile device 100 by physically handled). An exemplary method 800 of operating an access control system 500 is illustrated in FIG. 3. The method 800 may be performed, for example, using either of the exemplary access control systems 500 shown in FIGS. 1 and 2, which include an access control device 200.

The method 800 includes step 810 for initiating the transmission of the advertising signal by a communication module 210 of the access control device 200, the advertising signal being received by the mobile device 100 (e.g., in the communication module 110). As described above, the transmission of the advertising signal by the communication module 210 of the access control device 200 may be initiated by a detection of a status event (e.g., a movement of a compartment, a vibration detection, a motion detection, a sound detection, an infrared detection, and a rotation of a handle).

The method 800 includes step 820 for receiving, automatically, an access credential from the mobile device 100 in the communication module 210 of the access control device 200. As mentioned above, the automatic receiving of the access credential (e.g., which may be achieved by the automatic transmission from the mobile device 100) may be conditioned on various factors (e.g., signal strength, identity verification within a certain period of time, and/or movement of the mobile device 100). The method 800 includes step 830 for comparing, in the authentication module 240 of the access control device 200, the access credential with an authorized access credential. If the access credential matches the authorized access credential, the method 800 provides step 840 for unlocking the protected environment (e.g., the compartment 260 housing a key to a house). If the access credential does not match the authorized access credential, the method 800 provides step 850 for keeping the protected environment locked. As mentioned above, the access control system 500 may provide for exception handling (e.g., to allow manual entry of a PIN code) in the event that the protected environment remains locked. It is envisioned that in certain instances, the method 800 may allow a key (e.g., to a house being sold) to be taken out of a compartment 260 without requiring the real estate agent to handle their phone while in the proximity of the access control device 200 (i.e., a lockbox). As mentioned throughout, this may reduce the amount of time required to obtain the key to access the house, which may allow the real estate agent to show more houses than may otherwise be allowed using existing systems.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An access control system comprising:
   an access control device comprising:
   a communication module configured to wirelessly transmit an advertising signal when initiated, and to wirelessly receive an access credential from a mobile device;
   a detection sensor electrically coupled to the communication module, the detection sensor configured to initiate the transmission of the advertising signal by the communication module when a status event is detected;
   a memory for storing an authorized access credential; and
   an authentication module electrically coupled with the communication module and the memory, the authentication module configured to compare the access credential with the authorized access credential wherein
   the mobile device is configured to automatically transmit the access credential, and wherein transmission of the access credentials is conditioned on a signal strength of the advertising signal, and
   wherein the automatic transmitting of the access credential is deactivated responsive to the access credential not matching an authorized access credential; and
   wherein the transmitting of the access credential is further conditioned on a movement of the mobile device, wherein the movement of the mobile device indicates whether the mobile device has been continuously carried or set down, and wherein responsive to an indication of the mobile device being continuously carried the access credential is automatically transmitted, and responsive to an indication of the mobile being set down, the access credential is not automatically transmitted.

2. The access control system of claim 1, wherein transmitting of the access credential is conditioned on a validation of a biometric identifier, and wherein the biometric identifier is captured by the mobile device.

3. The access control system of claim 2, wherein the captured biometric identifier is compared with an authorized biometric identifier stored in a memory of the mobile device.

4. The access control system of claim 3, wherein the captured biometric identifier is validated when the captured biometric identifier matches the authorized biometric identifier.

5. The access control system of claim 3, wherein the automatic transmitting of the access credential is deactivated when the captured biometric identifier does not match the authorized biometric identifier.

6. The access control system of claim 3, wherein the automatic transmitting of the access credential is maintained when the captured biometric identifier matches the authorized biometric identifier.

7. The access control system of claim 2, wherein the biometric identifier comprises at least one of: a fingerprint, a facial image, an iris image, a voice recording, and a gait pattern.

8. The access control system of claim 1, wherein the access control device further comprises a lock actuator configured to unlock when the access credential matches the stored authorized access credential.

9. The access control system of claim 8, wherein the access control device further comprises a compartment operably coupled with the lock actuator.

10. The access control system of claim 9, wherein the status event comprises at least one of: a movement of the compartment, a vibration detection, a motion detection, a sound detection, an infrared detection, and a rotation of a handle.

11. The access control system of claim 1, wherein at least one of the advertising signal and the access credential are transmitted using a short-range communication, the short-range communication comprising at least one of: Bluetooth, Bluetooth Low Energy (BTLE), Zigbee, infrared, and Wi-Fi.

12. The access control system of claim 1, wherein the access control device is battery powered.

13. A method for operating an access control system comprising an access control device, the method comprising:
   initiating the transmission of the advertising signal by a communication module of the access control device, the advertising signal being received by a mobile device;
   automatically transmitting an access credential from the mobile device, wherein transmission of the access credential is conditioned on a signal strength of the advertising signal;
   receiving the access credential from the mobile device in the communication module of the access control device, the communication module of the access control device electrically coupled with an authentication module of the access control device; and
   comparing, in the authentication module, the access credential with an authorized access credential, the authorized access credential being stored in a memory of the access control device wherein the automatic transmitting of the access credential is deactivated responsive to the access credential not matching an authorized access credential; and
   wherein the transmitting of the access credential is further conditioned on a movement of the mobile device, wherein the movement of the mobile device indicates whether the mobile device has been continuously carried or set down, and wherein responsive to an indication of the mobile device being continuously carried the access credential is automatically transmitted, and responsive to an indication of the mobile being set down, the access credential is not automatically transmitted.

14. The method of claim 13, further comprising unlocking a compartment when the access credential matches the stored authorized access credential.

15. The method of claim 14, further comprising actuating the compartment to release a key from within the compartment.

16. The method of claim 13, wherein the transmission of the advertising signal is initiated by the detection of a status event.

17. The method of claim 16, wherein the status event comprises at least one of: a movement of a compartment, a vibration detection, a motion detection, a sound detection, an infrared detection, and a rotation of a handle.

* * * * *